(12) United States Patent
Gieras et al.

(10) Patent No.: US 10,461,594 B2
(45) Date of Patent: Oct. 29, 2019

(54) REDUCTION OF STARTING CURRENT IN LINE START PERMANENT MAGNET BRUSHLESS MOTORS

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 324 days.

(21) Appl. No.: 15/386,094

(22) Filed: Dec. 21, 2016

(65) Prior Publication Data

US 2018/0175680 A1 Jun. 21, 2018

(51) Int. Cl.
| | |
|---|---|
| H02K 1/22 | (2006.01) |
| H02K 3/04 | (2006.01) |
| H02K 21/14 | (2006.01) |
| H02P 6/20 | (2016.01) |
| H02K 21/46 | (2006.01) |
| H02P 1/24 | (2006.01) |
| H02P 1/26 | (2006.01) |

(52) U.S. Cl.
CPC ............... *H02K 1/223* (2013.01); *H02K 3/04* (2013.01); *H02K 21/14* (2013.01); *H02K 21/46* (2013.01); *H02P 1/24* (2013.01); *H02P 1/26* (2013.01); *H02P 6/20* (2013.01); *H02P 2207/01* (2013.01); *H02P 2207/05* (2013.01)

(58) Field of Classification Search
CPC .......... H02K 1/223; H02K 3/04; H02K 21/14; H02K 21/46; H02P 1/26; H02P 1/24; H02P 6/20; H02P 2207/01; H02P 2207/05
See application file for complete search history.

(56) References Cited

U.S. PATENT DOCUMENTS

| | | | | |
|---|---|---|---|---|
| 4,506,181 | A | * 3/1985 | Jones ..................... | H02K 21/46 310/156.78 |
| 5,068,560 | A | * 11/1991 | Lundquist ............ | H02K 17/165 310/125 |
| 5,548,172 | A | 8/1996 | Kliman et al. | |
| 5,859,513 | A | 1/1999 | Stephens et al. | |
| 5,952,757 | A | 9/1999 | Boyd, Jr. | |
| 6,029,336 | A | 2/2000 | Kliman et al. | |
| 6,727,627 | B1 | * 4/2004 | Sasaki .................... | H02K 1/276 310/156.53 |
| 7,923,881 | B2 | * 4/2011 | Ionel ...................... | H02K 21/46 310/156.53 |
| 2007/0284961 | A1 | * 12/2007 | Takahashi .............. | H02K 1/276 310/156.78 |
| 2009/0160285 | A1 | * 6/2009 | Kikuchi ................. | H02K 21/46 310/156.78 |

(Continued)

*Primary Examiner* — Emily P Pham
(74) *Attorney, Agent, or Firm* — Cantor Colburn LLP

(57) ABSTRACT

A rotor of line start permanent magnet synchronous motor is provided. The rotor includes bars of cage windings. The rotor includes an additional inductance coupled to the cage windings and located on a first end of the bars. The rotor includes an end ring located on a second end of the bars. The additional inductance provides a reactance to reduce a starting current during an asynchronous starting of the line start permanent magnet synchronous motor.

12 Claims, 5 Drawing Sheets

(56) References Cited

U.S. PATENT DOCUMENTS

| | | | |
|---|---|---|---|
| 2012/0194027 A1* | 8/2012 | Baydasov | H02K 17/165 |
| | | | 310/197 |
| 2014/0285050 A1 | 9/2014 | Melfi et al. | |
| 2017/0085161 A1* | 3/2017 | Gieras | H02K 17/30 |

* cited by examiner

US 10,461,594 B2

REDUCTION OF STARTING CURRENT IN LINE START PERMANENT MAGNET BRUSHLESS MOTORS

BACKGROUND

Generally, because a permanent magnet (PM) synchronous motor is not self-starting, implementations of PM synchronous motors include a frequency-change starting method using a variable-voltage variable-frequency (VVVF) solid-state inverter. When the speed control is not required, a rotor cage winding method can be a more cost-effective solution to starting the PM synchronous motor because the VVVF solid-state inverter is not necessary. A rotor cage winding method equips the PM rotor with a cage winding to provide asynchronous starting. A PM synchronous motor with asynchronous starting can be referred to as a conventional line start motor. However, conventional line start motors rated at about 10 kW and above, may draw an unacceptably high inrush current exceeding several times the rated current.

BRIEF DESCRIPTION

In accordance with one or more embodiments, a rotor of line start permanent magnet synchronous motor is provided. The rotor includes bars of cage windings. The rotor includes an additional inductance coupled to the cage windings and located on a first end of the bars. The rotor includes an end ring located on a second end of the bars. The additional inductance provides a reactance to reduce a starting current during an asynchronous starting of the line start permanent magnet synchronous motor.

In accordance with one or more embodiments or the rotor embodiment above, the additional inductance can comprise a plurality of coils.

In accordance with one or more embodiments or any of the rotor embodiments above, each coil of the plurality of coils can comprise one or more turns, two or more terminals, and two or more holes for receiving the two or more bars.

In accordance with one or more embodiments or any of the rotor embodiments above, the one or more turns can comprise five turns.

In accordance with one or more embodiments or any of the rotor embodiments above, the plurality of coils can comprise eight coils each of which is coupled to the two or more bars.

In accordance with one or more embodiments or any of the rotor embodiments above, the two or more bars can comprise eight rotor bars.

In accordance with one or more embodiments or any of the rotor embodiments above, the rotor can comprise a second additional inductance configured on the second end of the two or more bars.

In accordance with one or more embodiments or any of the rotor embodiments above, the line start permanent magnet brushless motor can comprise interior one or more V-shaped permanent magnets.

In accordance with one or more embodiments or any of the rotor embodiments above, the additional inductance can comprise an inductor equipped with a ring-shaped ferromagnetic core.

In accordance with one or more embodiments or any of the rotor embodiments above, the ring-shaped ferromagnetic core can comprise laminations or sintered powder.

In accordance with one or more embodiments or any of the rotor embodiments above, the line start permanent magnet synchronous motor can be included in an aircraft electric system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein relate to a line start PM brushless motor that implements a rotor cage winding with speed-dependent inductance. The technical effects and benefits of the line start PM brushless motor embodiments overcome problems with conventional line start motors, such as drawing unacceptable high inrush current, by implementing the rotor cage winding with speed-dependent inductance to reduce a starting current of the line start PM brushless motor.

Figure 1:
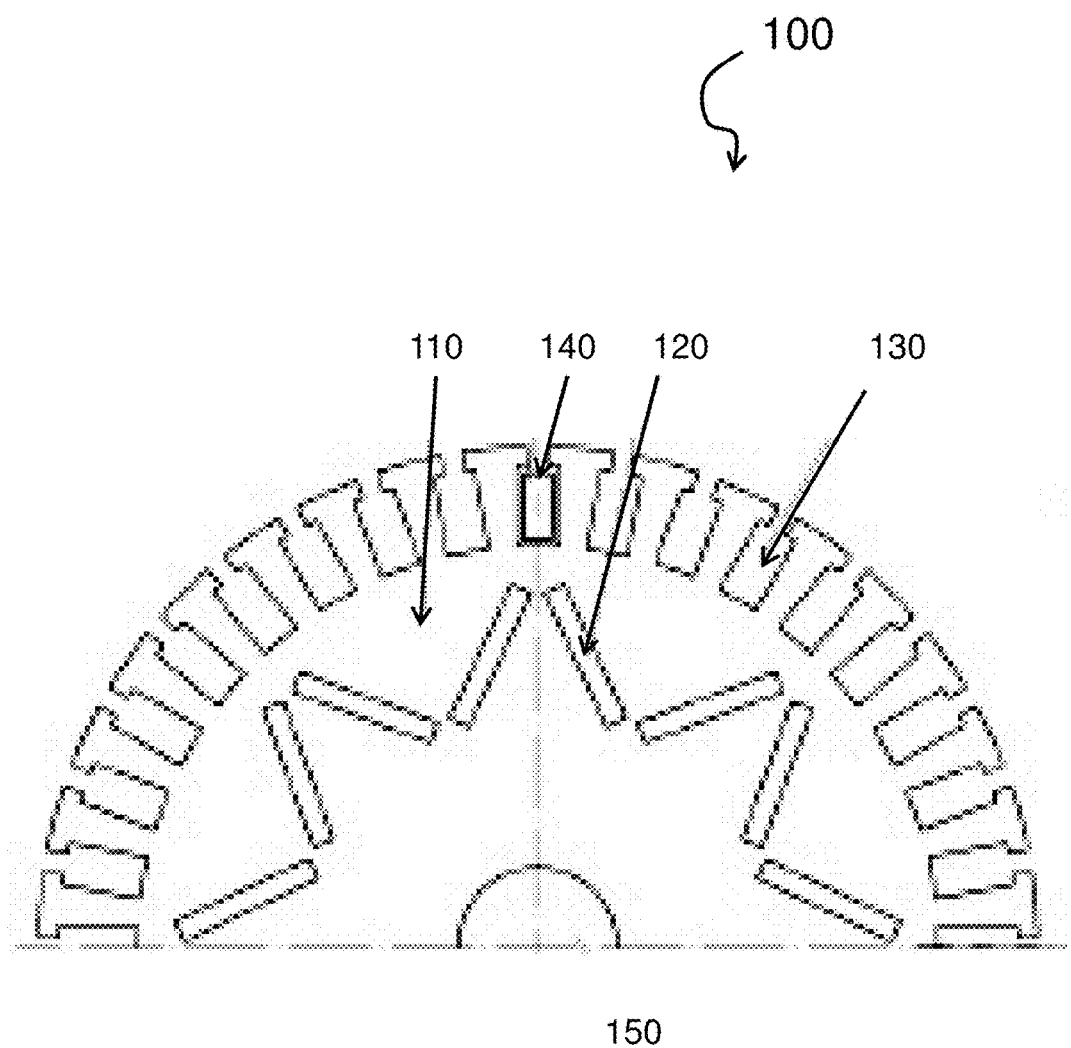
FIG. 1 depicts a cross section of line start PM synchronous motor in accordance with one or more embodiments.

Turning now to FIG. 1, a cross section of line start PM synchronous motor 100 is depicted according to one or more embodiments. As shown in FIG. 1, the line start PM brushless motor 100 includes a rotor lamination 110, one or more PMs 120, a rotor slot 130, a bar of a cage winding 140 (e.g., a bar shaped cage winding), and a shaft 150. In accordance with a non-limiting embodiment, the line start PM brushless motor 100 comprises interior V-shaped PMs (e.g., 120) and cage windings (e.g., 140) inserted in rectangular slots. Note that other shapes of PMs and slots for cage windings are also contemplated.

Figure 2:
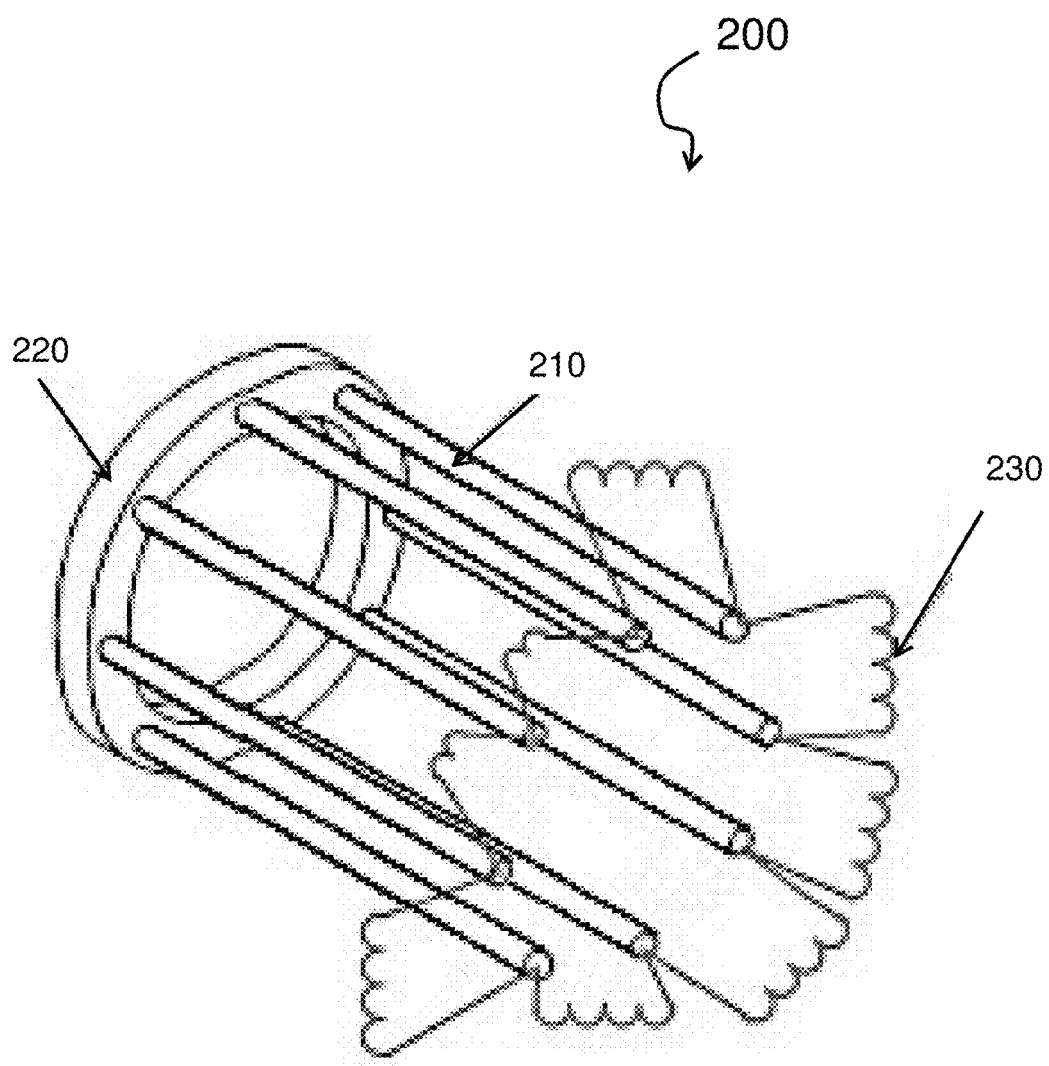
FIG. 2 depicts a perspective view of a line start PM synchronous motor with additional inductance at one side in accordance with one or more embodiments.

Turning now to FIG. 2, a perspective view of a rotor 200 of a line start PM synchronous motor 200 of FIG. 1 with additional inductance at one side is depicted in accordance with one or more embodiments. As shown in FIG. 2, the rotor 200 includes two or more bars 210, an end ring 220 configured on a first end of the two or more bars 210, and an additional inductance 230 configured on a second end of the two or more bars 210.

The rotor 200 comprises additional inductance 230 inserted into the rotor bars (e.g., bars 210) of the cage winding. Thus, a reactance of the rotor 200 during an asynchronous starting operation behaves according to Equation 1.

$$X_r + 2\pi s f L = 2\pi s f (L_r + L),\quad\text{Equation 1:}$$

where $X_r$ is the reactance of the rotor cage winding, $L_r$ is the inductance of the rotor cage winding, L is the additional inductance 230 (also referred to as additional inductor), f is the frequency of the stator current and magnetic flux, and s is the so called "slip" at the asynchronous starting. The slip can operate according to Equation 2.

$$s = \frac{n_s - n}{n_s}, \quad \text{Equation 2}$$

where $n_s$ is the speed of the stator magnetic field equal to the synchronous speed of the rotor 200 after starting and n is a speed of the rotor 200 during the asynchronous starting.

When the rotor is at standstill (e.g., n=0), the slip is equal to one (s=1), the frequency in the rotor is equal to the frequency of the current in a stator of the line start PM brushless motor (sf=f), and the reactance of the additional inductance 230 is high ($2\pi sfL=2\pi fL$). The high reactance added by the additional inductance 230 reduces the starting current. As the speed increases, the slip decreases and the additional inductance 230 also decreases. As slip approaches zero, the additional inductance 230 is negligible. Thus, the rotor reactance is inherently adjusted to the rotor speed and keeps the current at the desired level. At synchronous speed (e.g., n=$n_s$), the slip is equal to zero (s=0), the frequency of current in the rotor is equal to zero (sf=0), so the cage winding does not participate in the production of the electromagnetic torque.

Figure 3:
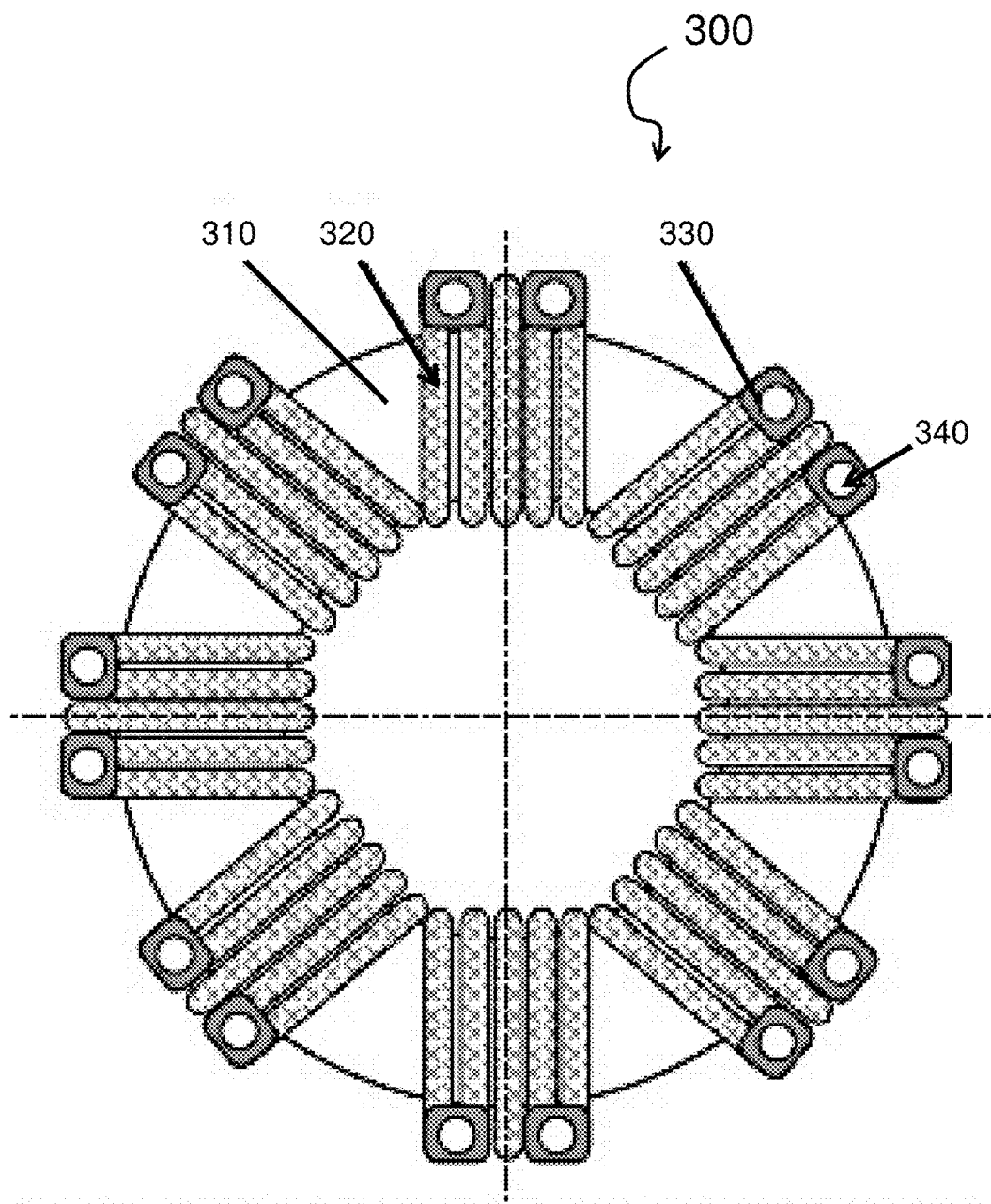
FIG. 3 depicts a cross section of a line start PM synchronous motor for reducing a starting current in accordance with one or more embodiments.
Figure 4:
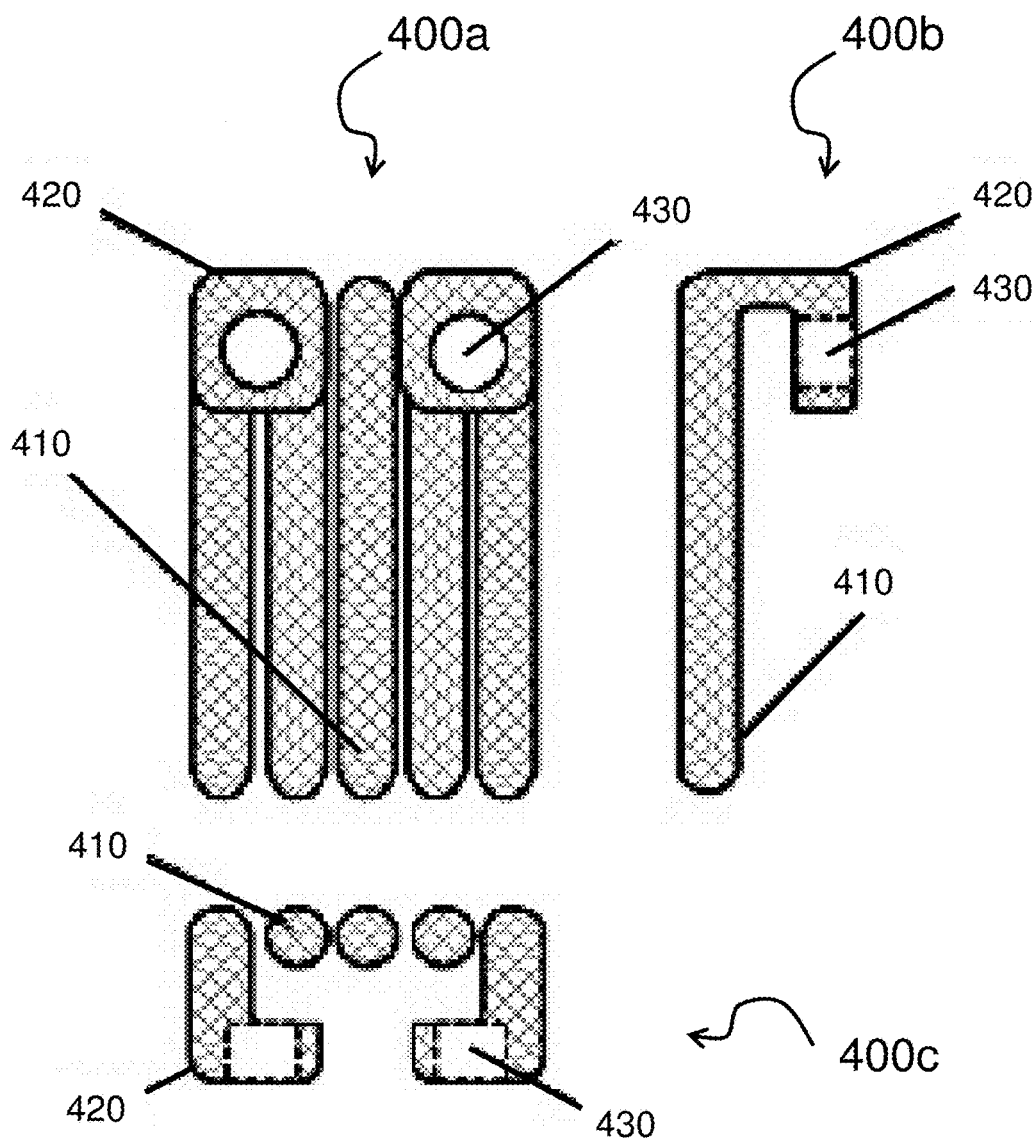
FIG. 4 depicts a single coil of an inductor of the line start PM synchronous motor of FIG. 3 in accordance with one or more embodiments.

Turning now to FIG. 3, a cross section of a line start PM synchronous motor 300 for reducing a starting current is depicted in accordance with one or more embodiments. As shown in FIG. 3, the line start PM synchronous motor 300 comprises a ring-shaped ferromagnetic core 310 (which can be laminated or sintered) and one or more coils 320 of the additional inductance. Each of the coils can comprise two or more terminals 330 for connection with rotor bars 340 within the holes of the terminals (e.g., eight rotor bars). An example of the one of the coils 320 is further described with respect to FIG. 4. FIG. 4 depicts a coil of an additional inductance in accordance with one or more embodiments. The coil comprises one or more turns 410 (e.g., the coil comprises any number of turns equal to or greater than one, such as five (5) turns), two or more terminals 420, and two or more holes 430 for receiving bars. FIG. 4, further depicts, a front view of the coil 400a, a profile view of the coil 400b, and a top-down view of the coil 400c.

Figure 5:
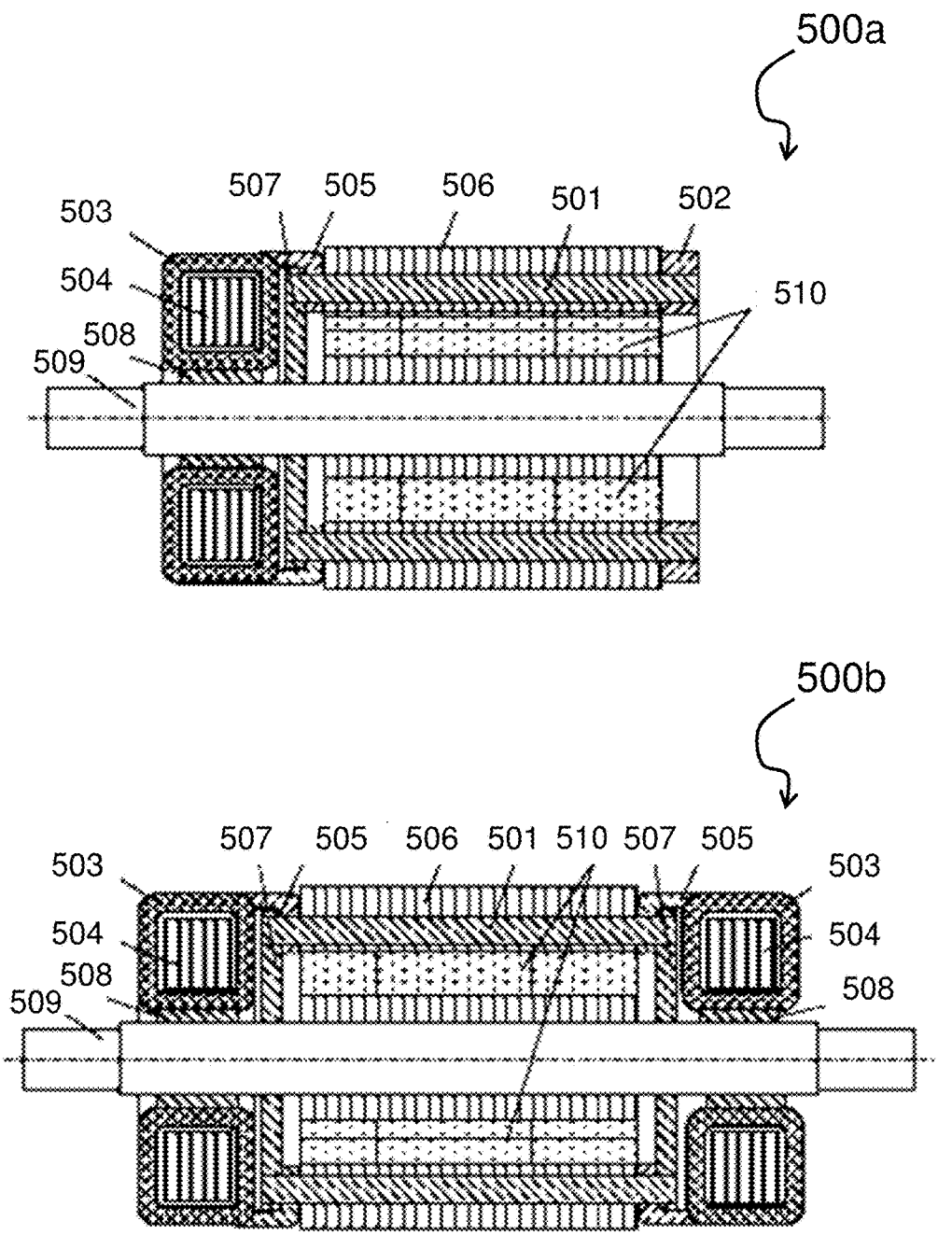
FIG. 5 depicts PM rotors with cage windings and an additional inductance in accordance with one or more embodiments.

Turning now to FIG. 5, PM rotors 500a and 500b with cage windings and an additional inductance are depicted in accordance with one or more embodiments. Generally, the PM rotors 500a and 500b can comprise at least two bars 501 of the rotor cage, an end ring 502 of the rotor cage, an additional inductance 503 (e.g., inductor coils) for reducing the stator current at standstill, a ferromagnetic core 504 of the additional inductor, a terminal connecting 505 the inductor with the at least one rotor bar 501, a rotor ferromagnetic core 506 (e.g., a laminated stack), a support 507 for the rotor bar and inductor coils (e.g., current-nonconducting material), a bushing 508 (e.g., support of the inductor coils), a shaft 509, and PMs 510. The additional inductance 503 can be an inductor equipped with a ring-shaped ferromagnetic core 504 made of laminations or sintered powder. The additional inductor 503 can be placed at one side of the rotor (e.g., rotor with one inductor 500a) or at both sides of the rotor (e.g., rotor with two inductors at both side of the rotor stack 500b).

The technical effects and benefits of the line start PM brushless motor embodiments include a reduction of starting current of line start PM brushless (synchronous) motors, especially with respect to those rated above 10 kW. The technical effects and benefits of the line start PM brushless motor embodiments also include a reduction of voltage sags in power distribution systems, particularly in those of space, land vehicles, and sea vessels. The technical effects and benefits of the line start PM brushless motor embodiments include a simple and/or compact construction, with no solid-state devices or no power electronics (thereby reducing and/or eliminating maintenance and increasing reliability). The technical effects and benefits of the line start PM brushless motor embodiments include an ability to adjust conventional line start motors by adding the additional inductance. Applications of the e line start PM brushless motor embodiments include aircraft electric systems, e.g. as air-conditioning, nitrogen production, actuator motors, etc.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor of a line start permanent magnet synchronous motor, the rotor comprising:
    two or more bars of cage windings;
    an additional inductance coupled to the cage windings and configured on a first end of the two or more bars; and
    an end ring configured on a second end of the two or more bars,
    wherein the additional inductance provides a reactance to reduce a starting current during an asynchronous starting of the line start permanent magnet synchronous motor.

2. The rotor of claim 1, wherein the additional inductance comprises a plurality of coils.

3. The rotor of claim 2, wherein the each coil of the plurality of coils comprises one or more turns, two or more terminals, and two or more holes for receiving the two or more bars.

4. The rotor of claim 3, wherein the one or more turns comprises five turns.

5. The rotor of claim 3, wherein the plurality of coils comprises eight coils each of which is coupled to the two or more bars.

6. The rotor of claim 1, wherein the two or more bars comprises eight rotor bars.

7. The rotor of claim 1, comprising a second additional inductance configured on the second end of the two or more bars.

8. The rotor of claim 1, wherein the line start permanent magnet brushless motor comprises interior one or more V-shaped permanent magnets.

9. The rotor of claim 1, wherein the additional inductance comprises an inductor equipped with a ring-shaped ferromagnetic core.

10. The rotor of claim 1, wherein the ring-shaped ferromagnetic core comprises laminations or sintered powder.

11. A line start permanent magnet synchronous motor including the rotor of claim 1, wherein the line start permanent magnet synchronous motor is included in an aircraft electric system.

12. The rotor of claim 1, wherein the reactance of the additional inductance is based on slip of the permanent magnet synchronous motor.

* * * * *